United States Patent
Loke et al.

(10) Patent No.: US 9,180,851 B2
(45) Date of Patent: Nov. 10, 2015

(54) MASTER CYLINDER IN PARTICULAR FOR A CONTROLLED MOTOR VEHICLE BRAKE SYSTEM

(75) Inventors: Jörg Loke, Brechen (DE); Peter Drott, Frankfurt am Main (DE); Thanh-Quyen Tran, Frankfurt (DE); Heiko Leptich, Wiesbaden (DE); Harald König, Ober-Mölen (DE)

(73) Assignee: Continental Teves AG & Co. oHG (DE)

( * ) Notice: Subject to any disclaimer, the term of this patent is extended or adjusted under 35 U.S.C. 154(b) by 911 days.

(21) Appl. No.: 13/384,429

(22) PCT Filed: Jul. 12, 2010

(86) PCT No.: PCT/EP2010/059956
§ 371 (c)(1),
(2), (4) Date: Apr. 5, 2012

(87) PCT Pub. No.: WO2011/012431
PCT Pub. Date: Feb. 3, 2011

(65) Prior Publication Data
US 2012/0186246 A1 Jul. 26, 2012

(30) Foreign Application Priority Data
Jul. 31, 2009 (DE) .......................... 10 2009 035 631

(51) Int. Cl.
| B60T 11/16 | (2006.01) |
| B60T 11/20 | (2006.01) |
| F15B 15/22 | (2006.01) |
| B60T 11/236 | (2006.01) |

(52) U.S. Cl.
CPC ............... B60T 11/20 (2013.01); B60T 11/236 (2013.01); F15B 15/226 (2013.01)

(58) Field of Classification Search
CPC ...... B60T 11/236; B60T 11/20; F15B 15/226
USPC ..... 92/135, 130 R, 130 D, 85 R, 143; 60/562, 60/585
See application file for complete search history.

(56) References Cited

U.S. PATENT DOCUMENTS

| 3,465,650 A * | 9/1969 | Gluck ........................... 92/85 R |
| 5,014,599 A * | 5/1991 | Kocsis et al. ..................... 92/84 |
| 7,997,075 B2 * | 8/2011 | Drott et al. ...................... 60/588 |
| 2009/0026830 A1 * | 1/2009 | Shiraishi et al. ............. 301/11.3 |

FOREIGN PATENT DOCUMENTS

| DE | 10 2004 057 137 A1 | 8/2005 |
| GB | 1 204 739 | 9/1970 |

OTHER PUBLICATIONS

International Search Report for PCT International Application No. PCT/EP2010/059956 mailed Sep. 27, 2011.

* cited by examiner

Primary Examiner — Dwayne J White
Assistant Examiner — Logan Kraft
(74) Attorney, Agent, or Firm — RatnerPrestia

(57) ABSTRACT

The invention relates to a master cylinder, in particular for a controlled motor vehicle brake system, including a first and a second piston which is displaceable in a housing and has a captive spring, a first end of the spring bearing at least indirectly against the piston and a second end thereof against a sleeve which is displaceable with respect to the piston and the movement of which with respect to the piston is limited by a pin provided on the piston and by a stop washer, the stop washer being arranged on a free end of the pin. In order to avoid impact noise upon rapid release of the brake, the stop washer of the first piston has a device for the damped abutment of the sleeve.

6 Claims, 3 Drawing Sheets

MASTER CYLINDER IN PARTICULAR FOR A CONTROLLED MOTOR VEHICLE BRAKE SYSTEM

CROSS REFERENCE TO RELATED APPLICATIONS

This application is the U.S. National Phase Application of PCT/EP2010/059956, filed Jul. 12, 2010, which claims priority to German Patent Application No. 10 2009 035 631.2, filed Jul. 31, 2009, the contents of such applications being incorporated by reference herein.

FIELD OF THE INVENTION

The invention relates to a master cylinder, in particular for a controlled motor vehicle brake system, comprising a first and a second piston which is displaceable in a housing and has a captive spring, a first end of the spring bearing at least indirectly against the piston, and a second end thereof against a sleeve which is displaceable with respect to the piston and the movement of which with respect to the piston is limited by a pin provided on the piston and by a stop washer, the stop washer being arranged on a free end of the pin.

BACKGROUND OF THE INVENTION

A master cylinder of this type is known, for example, from DE 10 2004 057 137 A1, which is incorporated by reference. It is considered to be a disadvantage of the known master cylinder that upon rapid release of the brake the sleeve of the first piston abruptly strikes the stop washer, since the captive spring urges the first piston back to its starting position against the direction of actuation. In this case undesired impact noise is produced and is transmitted into a passenger compartment of the vehicle via a braking force booster fastened to the master cylinder.

SUMMARY OF THE INVENTION

It is therefore an aim of the present invention to make available a master cylinder which is improved with regard to the disadvantages of the known master cylinder which have been mentioned.

This is achieved according to aspects of the invention in that the stop washer of the first piston has means for the damped abutment of the sleeve. The troublesome impact noise which occurs especially upon rapid release of the brake can thereby be effectively avoided.

In order to simplify installation of the stop washer, the means are preferably provided on both sides of the stop washer. It is therefore unnecessary during assembly to pay attention to whether the stop washer is fastened the correct way round on the pin.

According to an advantageous embodiment of an aspect of the invention, the stop washer has a peripheral groove on both sides and the means are provided as elastic annular elements arranged in the respective peripheral grooves.

The stop washer preferably has a plurality of axially oriented bores which connect the grooves on both sides of the stop washer. The two annular elements are thereby connected to one another and are fastened to the stop washer in a captive manner.

Improved anchoring of the material of the annular elements can be achieved if the axially oriented bores have a crowned configuration.

According to an advantageous configuration of an aspect of the invention, a defined stroke of the first piston can be ensured in that the annular elements are configured in such a way that a collar of the sleeve can rest directly against the stop washer in an unactuated position of the master cylinder.

To this end the annular elements advantageously each have a peripheral lip and a peripheral recess, the peripheral lip projecting beyond a side face of the stop washer prior to abutment of the collar and being displaceable into the recess upon abutment of the collar.

The annular elements are preferably vulcanized onto the stop washer.

Even when the means are provided, the stability of the stop washer can be ensured in that the stop washer is provided as a precision metal stamping.

BRIEF DESCRIPTION OF THE DRAWINGS

The invention is best understood from the following detailed description when read in connection with the accompanying drawing. Included in the drawing are the following figures.

DETAILED DESCRIPTION OF THE PREFERRED EMBODIMENTS

Figure 1:
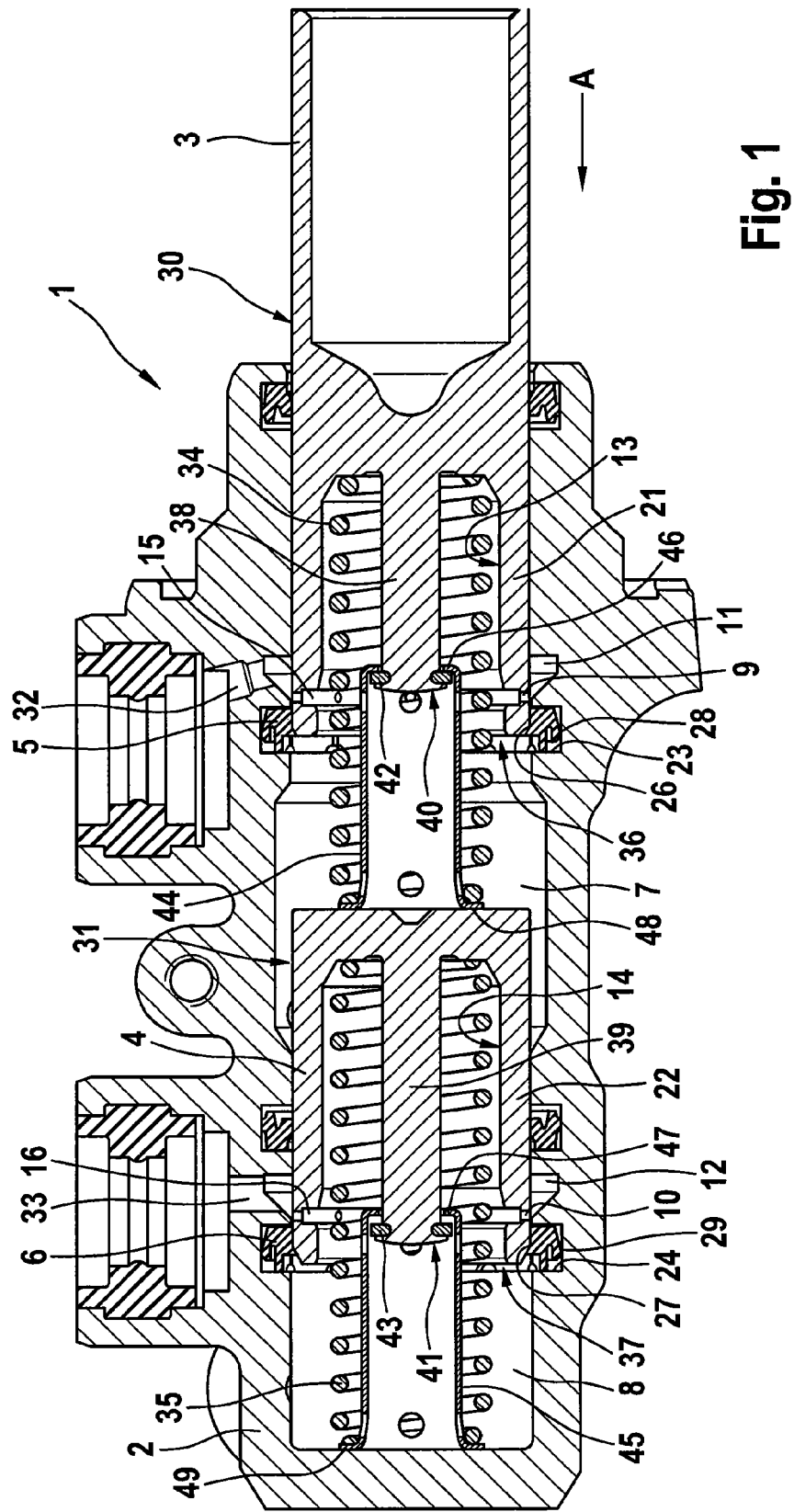
FIG. 1 shows a known master cylinder in longitudinal section.

FIG. 1 shows in longitudinal section a known master cylinder 1 which is used, for example, in a controlled brake system with anti-slip control (ASR) and/or Electronic Stability Program (ESP) and has a plunger-type tandem configuration.

The master cylinder 1 comprises a first and a second piston 3, 4 which are displaceable in a housing 2, a circular sealing element 5, 6 with a dynamically loaded inner sealing lip 26, 27 and a statically loaded outer sealing lip 28, 29 being provided in an annular groove 23, 24 of the housing 2. The dynamically loaded inner sealing lip 26, 27 bears with a first sealing face against the piston 3, 4 and the statically loaded outer sealing lip 28, 29 bears with a second sealing face against a base of the annular groove 23, 24. An outer face 30, 31 of the pistons 3, 4 serves as a guide surface.

In an unactuated state of the master cylinder 1 shown in FIG. 1, a first and a second pressure chamber 7, 8 are connected via a pressure medium passage 32, 33 and a return chamber 11, 12 in the housing 2, and via control apertures 9, 10 in a pot-shaped wall 21, 22 provided at one end 36, 37 of the first and second piston 3, 4, to an unpressurized pressure medium reservoir (not shown). Depending on its configuration, the master cylinder 1 has from four to twenty-four transverse bores 9, 10 on the circumference of the piston 3, 4. In this case the pistons 3, 4 are preloaded by means of compression springs 34, 35.

The compression spring 34, 35 is arranged at least partially within the pot-shaped wall 21, 22. A central pin 38, 39 projects through the middle of the wall 21, 22, ending before its axial exit from the wall 21, 22. This end 40, 41 is provided with a stop 42, 43 for a sleeve 44, 45 which interacts with a collar 46, 47 in such a way that the sleeve 44, 45 can be retracted telescopically within a limit. In other words, the sleeve 44, 45 with the compression spring 34, 35 is forced into the interior of the piston upon actuation. As will be seen, the stop 42, 43 is preferably an annular stop washer riveted—in particular wobble-riveted—to the pin 38, 39. The opposite end of the sleeve 44, 45 carries the plate-like collar 48, 49 against which the compression spring 34, 35 bears.

In order to actuate the master cylinder 1, the first piston 3 is displaced in the actuation direction A. As this happens the movement of the first piston 3 is transmitted to the second piston 4 via the compression spring 34. As soon as the transverse bores 9, 10 are in the region of the sealing elements 5, 6, that is, as soon as the lateral control edge of the bore has been passed, the so-called free travel of the master cylinder 1 has been covered, since pressure medium can no longer reach the pressure chambers 7, 8 from the return chambers 11, 12 through the transverse bores 9, 10. The connection of the pressure chambers 7, 8 to the pressure medium reservoir is interrupted and pressure is built up in the pressure chambers 7, 8.

The two pistons 3, 4, arranged in tandem, of the master cylinder 1 are practically identical in construction and operation, so that only the first piston 3 will be described further.

In the event of an ASR or ESP intervention it may be necessary, with the piston 3 unactuated or actuated, to draw pressure medium from the pressure medium reservoir via the pressure chamber 7 in the direction of the wheel brakes, which is preferably effected by means of a pump, the inlet of which is selectively connectable to the pressure chambers 7, 8 of the master cylinder 1 or to the wheel brakes in order to pump in the direction of the wheel brakes or of the master cylinder 1 (recirculation principle). For this purpose, in the event of an ASR intervention in the unactuated state of the master cylinder 1, the pressure medium is drawn from the pressure medium reservoir via the pressure medium passage 32, the return chamber 11, the transverse bores 9 and the pressure chamber 7. In the case of an ESP intervention in the actuated state of the master cylinder 1, pressure medium is additionally drawn through overflowing of the outer sealing lip 28 of the sealing element 5, this sealing lip 28 being folded over by the suction pressure in the direction of the inner sealing lip 26, and the sealing face of the outer sealing lip 28 therefore no longer bearing against the base of the annular groove 23. In order to make sufficient pressure medium quickly available to the pump in the event of an ASR or ESP intervention, especially in the unactuated position of the master cylinder 1, it is necessary to keep the throttling resistance of the transverse bores 9 as low as possible, although the free travel of the master cylinder 1 must also be kept as short as possible.

As is apparent from FIG. 1, the transverse bores 9, 10 open into respective grooves 15, 16 which are provided in inner faces 13, 14 of the pistons 3, 4 and which reduce the throttling resistance of the transverse bores 9, 10.

Figure 2:
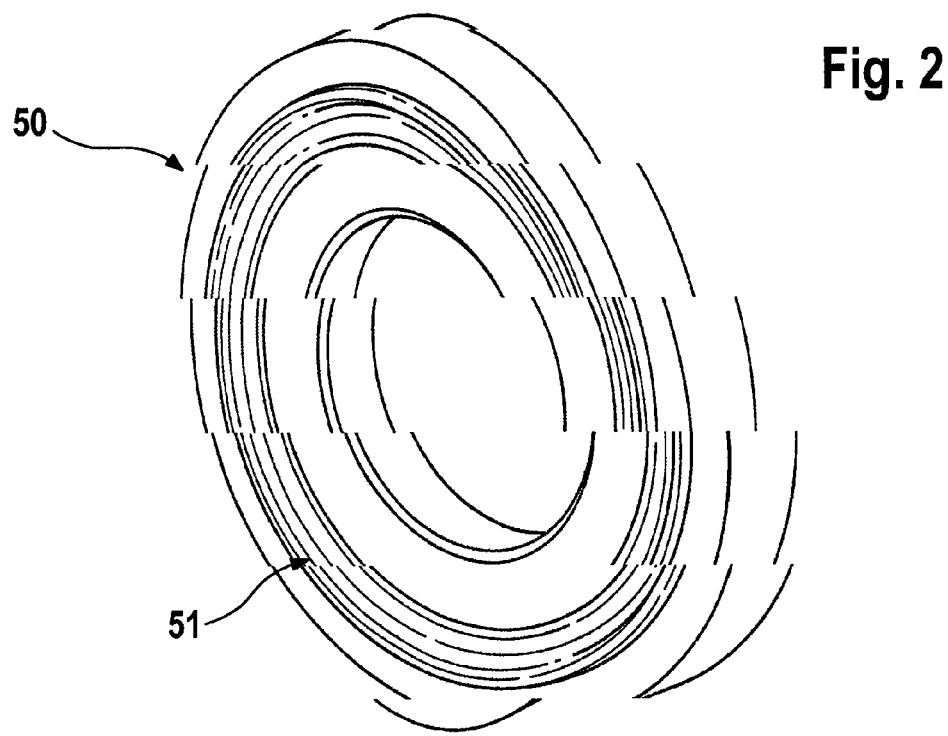
FIG. 2 shows a stop washer with vulcanized-on annular elements of a master cylinder according to the invention in a three-dimensional representation.
Figure 3:
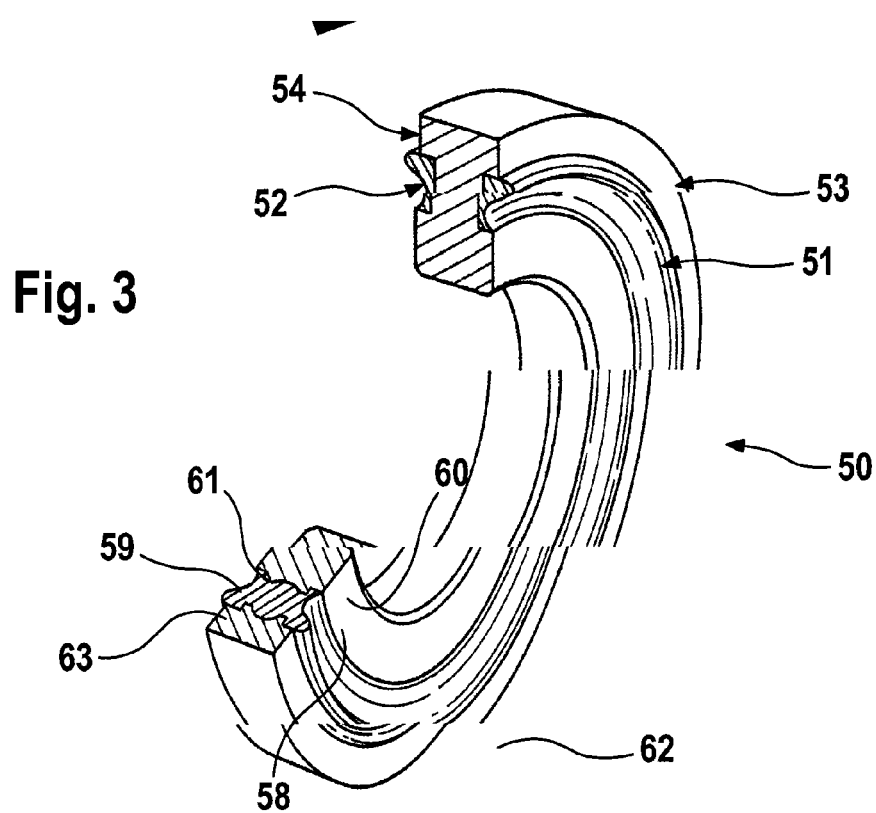
FIG. 3 shows a stop washer according to FIG. 2 in a partially sectional three-dimensional representation.
Figure 4:
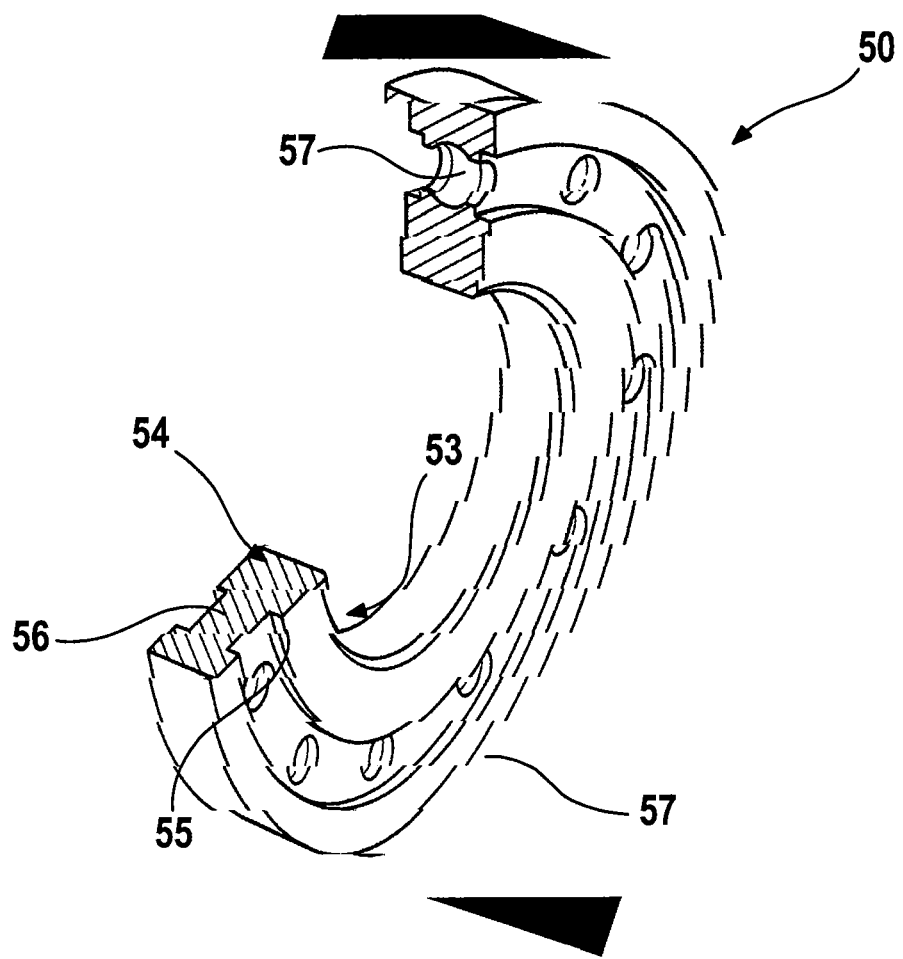
FIG. 4 shows the stop washer according to FIG. 2 without annular elements in a partially sectional three-dimensional representation.

FIGS. 2, 3 and 4 show a stop washer of a master cylinder 1 according to the invention in a partly sectional three-dimensional representation. The master cylinder 1 according to the invention does not differ in principle from the known master cylinder according to FIG. 1 in operation and construction, so that a repeated description of the operation and construction can be dispensed with and only the differences according to the invention will be discussed below.

In order effectively to avoid the impact noise upon rapid release of the brake which is considered to be disadvantageous, a stop washer 50 of the first piston 3 of the master cylinder 1 according to the invention has means for the damped abutment of the sleeve 44.

It is apparent from FIG. 3, in particular, that these means are provided as peripheral annular elements 51, 52 which are arranged on both sides 53, 54 of the stop washer 50. In principle it would be sufficient to provide a damping means on only the side against which the collar 46 of the sleeve 44 comes into abutment in the release position shown in FIG. 1. However, in order to simplify installation of the stop washer 50, the annular elements 51, 52 are provided on both sides 53, 54 of the stop washer 50. Incorrect fastening of the stop washer 50 to the pin 38 can thereby be excluded.

FIG. 4 shows the stop washer 50 prior to installation of the annular elements 51, 52. It can be seen that the stop washer 50 has peripheral grooves 55, 56 on both sides 53, 54, with a plurality of axially oriented bores 57 connecting the grooves 55, 56. The annular elements 51, 52 are molded into the grooves 55, 57, for example by means of vulcanizing. As the rubber material is vulcanized on, the bores 57 are filled, whereby the annular elements 51, 52 on both sides 53, 54 are connected to one another and fastened captively to the stop washer 50.

For improved anchoring of the rubber material, the bores 57 may have a crowned profile, as can be seen from FIG. 4.

FIG. 3 in particular shows that the annular elements 51, 52 are configured in such a way that in the unactuated position (release position) of the master cylinder 1 the collar 46 of the sleeve 44 can rest directly against the stop washer in order to ensure a defined stroke of the first piston 3. For this purpose the annular elements 51, 52 each have a peripheral lip 58, 59 and a peripheral recess 60, 61, the peripheral lip 58, 59 projecting beyond a side face 62, 63 of the stop washer 50 prior to abutment of the collar 46 and being displaceable into the recess 60, 61 upon abutment of the collar 46. In this case the recesses 60, 61 are dimensioned in such a way that the lips 58, 59 can be displaced into them without difficulty.

If the stop washer 50 is provided as a precision metal stamping, its stability can thereby be ensured even despite the grooves 55, 56 and bores 57.

Because, as is apparent from FIG. 1, the sleeve 45 of the second piston 4 does not come into abutment against the stop washer 43 in the release position, the use of the stop washer 50 described is restricted to the first piston 3.

LIST OF REFERENCES

1 Master cylinder
2 Housing
3 Piston
4 Piston
5 Sealing element
6 Sealing element
7 Pressure chamber
8 Pressure chamber
9 Control aperture
10 Control aperture
11 Return chamber
12 Return chamber
13 Inner face
14 Inner face
15 Internal groove
16 Internal groove
17 Main body
18 Control element
19 Outer face
21 Wall
22 Wall 23 Annular groove
24 Annular groove
26 Inner sealing lip
27 Inner sealing lip
28 Outer sealing lip
29 Outer sealing lip
30 Outer face
31 Outer face
32 Pressure medium passage
33 Pressure medium passage
34 Compression spring
35 Compression spring
36 End
37 End
38 Pin
39 Pin
40 End
41 End
42 Stop
43 Stop
44 Sleeve
45 Sleeve
46 Collar
47 Collar
48 Collar
49 Collar
50 Stop washer
51 Annular element
52 Annular element
53 Side
54 Side
55 Groove
56 Groove
57 Bore
58 Lip
59 Lip
60 Recess
61 Recess
62 Side face
63 Side face
A Actuation direction

The invention claimed is:

1. A master cylinder for a controlled motor vehicle brake system, comprising a first and a second piston which is displaceable in a housing and has a captive spring, a first end of the spring bearing at least indirectly against the first piston and a second end thereof against a sleeve which is displaceable with respect to the first piston and the movement of which with respect to the first piston is limited by a pin provided on the first piston and by a stop washer, the stop washer being arranged on a free end of the pin, wherein the stop washer of the first piston has means for the damped abutment of the sleeve,
  wherein the stop washer has on both sides a peripheral groove and the means are provided as elastic annular elements which are arranged in the respective peripheral grooves, and
  wherein the stop washer has a plurality of axially oriented bores which connect the grooves on both sides of the stop washer.

2. The master cylinder as claimed in claim 1, wherein the axially oriented bores have a crowned configuration.

3. The master cylinder as claimed in claim 2, wherein the annular elements are configured in such a way that, in an unactuated position of the master cylinder, a collar of the sleeve can rest directly against the stop washer.

4. The master cylinder as claimed in claim 3, wherein the annular elements each have a respective peripheral lip and a peripheral recess, the peripheral lip projecting beyond a side face of the stop washer prior to the abutment of the collar and being displaceable into the recess upon abutment of the collar.

5. The master cylinder as claimed in claim 1, wherein the annular elements are vulcanized onto the stop washer.

6. The master cylinder as claimed in claim 1, wherein the stop washer is provided as a precision metal stamping.

* * * * *